Nov. 7, 1933.   P. B. R. BAAS   1,934,291
METER TESTING DEVICE
Filed Feb. 8, 1932   3 Sheets-Sheet 2

WITNESSES
Edw. Thorpe
E. B. Marshall

INVENTOR
Philip B. R. Baas
BY Munn & Co.
ATTORNEY

Nov. 7, 1933.  P. B. R. BAAS  1,934,291
METER TESTING DEVICE
Filed Feb. 8, 1932  3 Sheets-Sheet 3
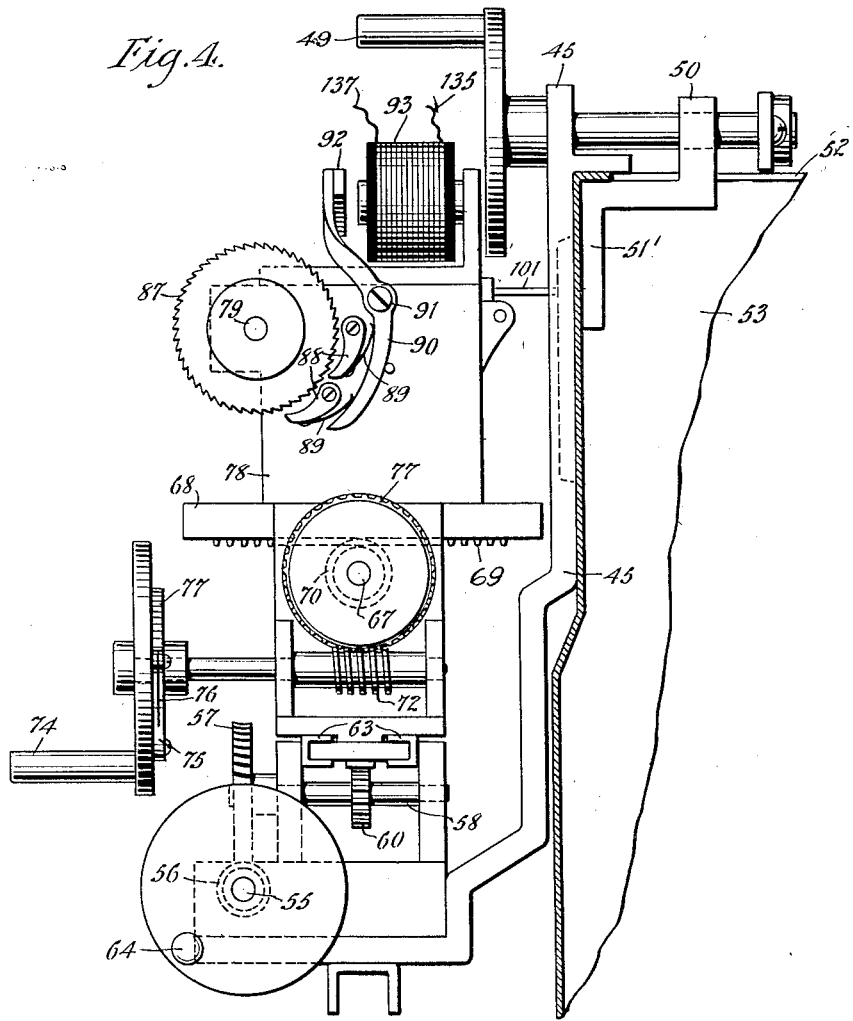
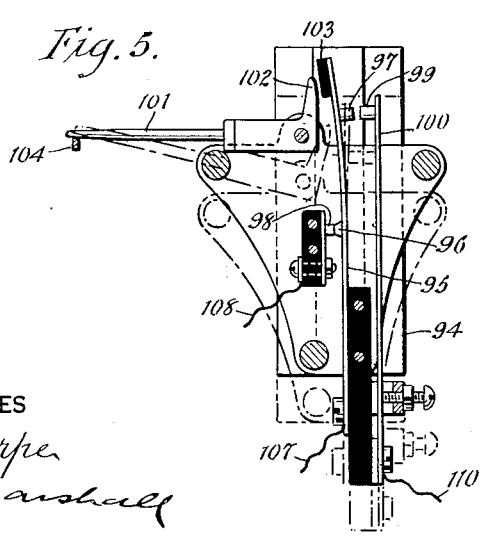
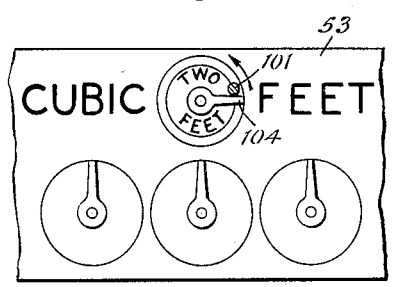
WITNESSES
Edw. Thorpe
L. B. Marshall
INVENTOR
Philip B. R. Baas
BY Munn & Co.
ATTORNEY Patented Nov. 7, 1933

1,934,291

UNITED STATES PATENT OFFICE 1,934,291

METER TESTING DEVICE

Philip B. R. Baas, Brooklyn, N. Y., assignor to Brooklyn Borough Gas Company, Brooklyn, N. Y., a corporation of New York Application February 8, 1932. Serial No. 591,704

15 Claims. (Cl. 73—51)

An object of the invention is to provide an automatic and accurate means for testing meters, and particularly displacement meters.

Another object of the invention is to provide means for testing meters operable by an index hand on the meter.

Still another object of the invention is to provide a lever for disposal adjacent the meter index hand, the lever, when moved against the meter index hand, serving to actuate means for opening communication between a gasometer and the meter, the meter index hand during its rotation engaging the lever and serving to actuate the said means to close communication between the said gasometer and the meter.

A further object of the invention is to provide two relays which are controlled by the lever and which serve to control the opening and closing of the valve between the gasometer and the meter.

The invention also includes automatic means for closing a valve commanding an inlet to the gasometer when a predetermined quantity of a fluid has been fed to the gasometer, said automatic means being manually controlled to open the valve.

Additional objects of the invention will appear in the following specification in which the preferred form of the invention is described.

Figure 1:
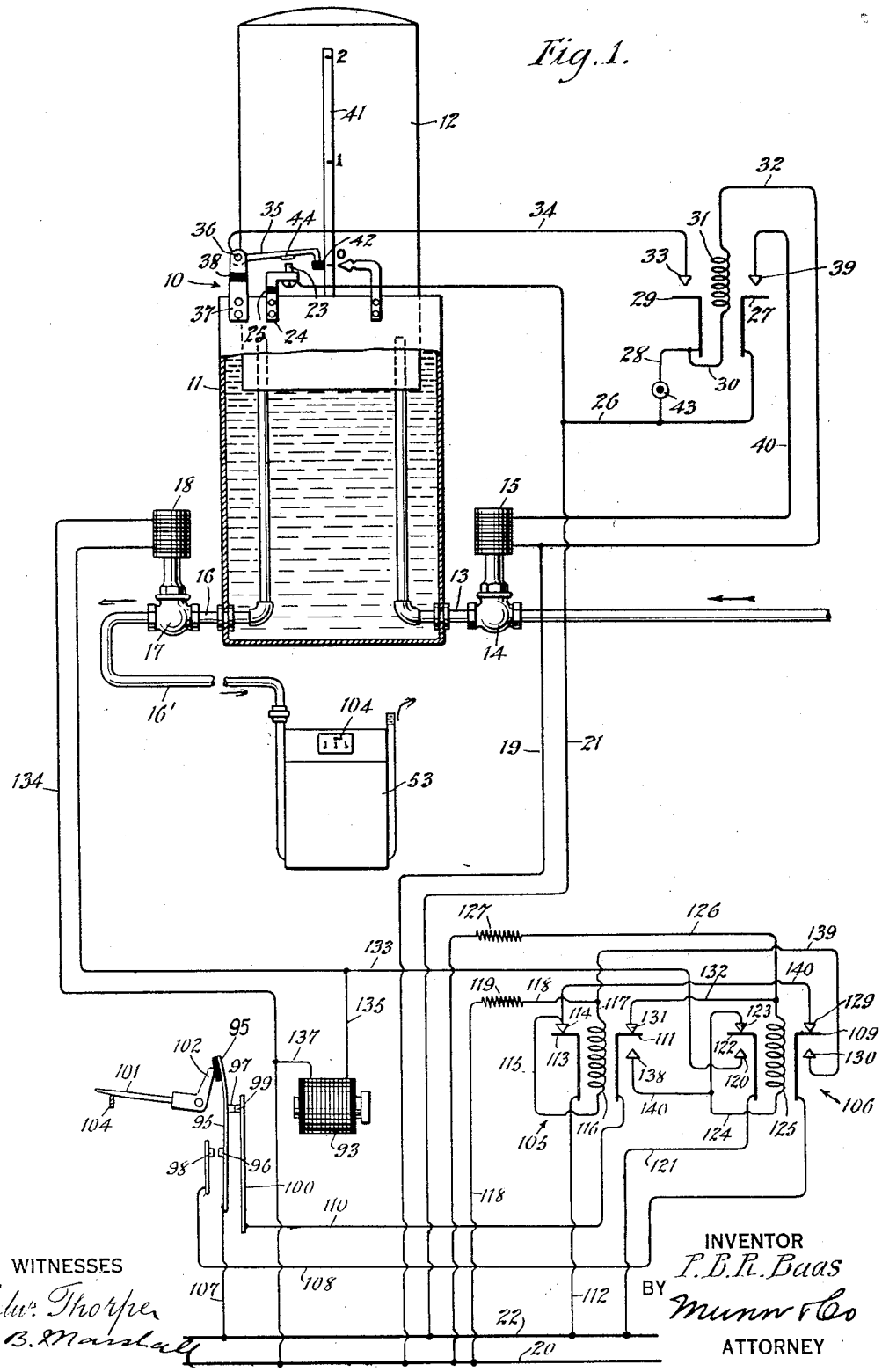
Figure 2:
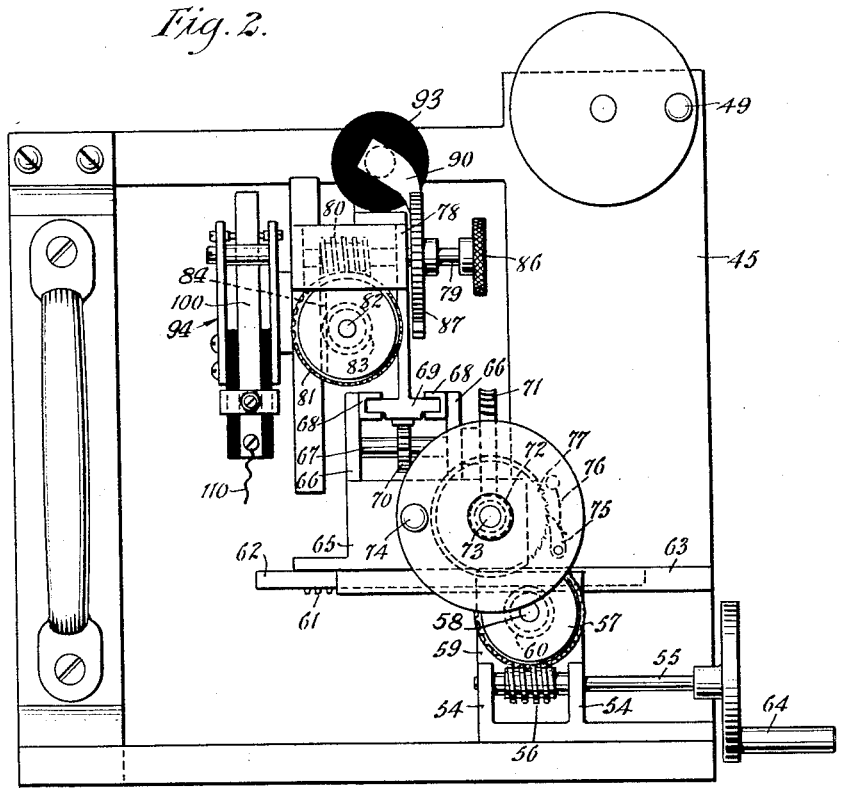
Figure 3:
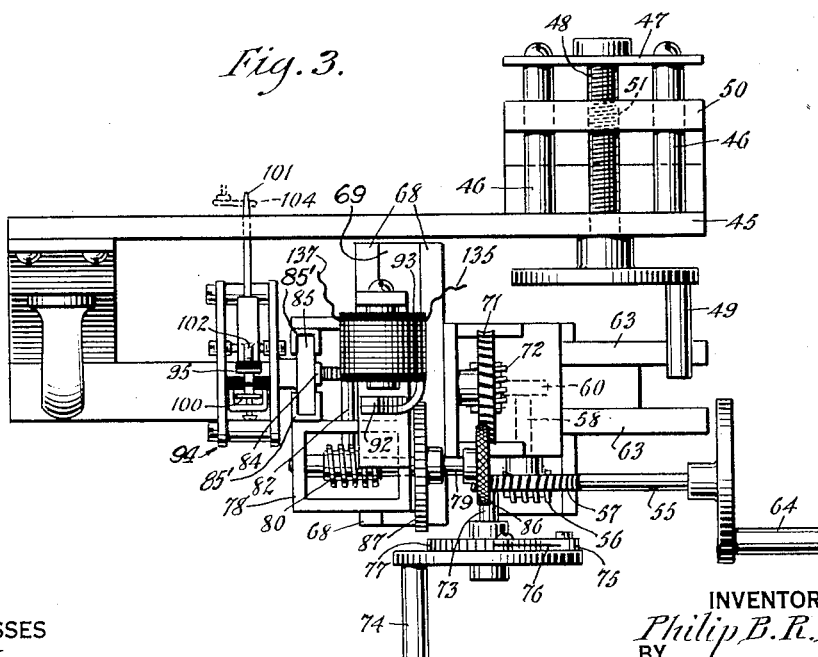

In the drawings similar reference characters refer to similar parts in all the views, of which Figure 1 is a diagrammatic view illustrating the invention and indicating the relationship of the several parts, Figure 2 is a front elevation of a frame having the lever which is attached to the meter, Figure 3 is a plan view of Figure 2, Figure 4 is a side elevation of Figure 2 on an enlarged scale, Figure 5 is an enlarged fragmentary sectional view illustrating the carriage which carries the lever and showing the relationship of the lever with the contact member and the contacts associated therewith, and Figure 6 is an enlarged fragmentary view illustrating the index hand at the meter and the lever associated therewith.

By referring to the drawings it will be seen that a gasometer 10 is provided, the gasometer 10 having a body 11 and a bell 12. The gasometer 10 is of the usual type and has an inlet 13 with a valve 14 controlled by a solenoid 15 and an outlet 16 with a valve 17 controlled by a solenoid 18. A conductor 19 is connected with a lead 20 and conductor 21 is connected with a lead 22, the conductor 21 being connected with a contact 23 mounted on the gasometer body 11 by a bracket 24, the contact 23 being insulated from the said body by insulating means 25. A conductor 26 leads from the conductor 21 to a contact 27 and a branch 28 leads from the said conductor 26 to a conductor 29 and through a conductor 30 to a relay coil 31, a conductor 32 leading from the said relay coil 31 to the conductor 19 and to the solenoid 15. There is a contact 33 from which extends a conductor 34 leading to a finger 35 pivoted at 36 to a bracket 37 mounted on the gasometer body 11 and which is insulated therefrom by insulating means 38. A contact 39 is connected with a conductor 40 which leads to the solenoid 15. The gasometer bell 12 has a scale 41 and at a point on the said scale 41, preferably at the zero mark, as indicated in Figure 1 of the drawings, there is a trip 42 which, as shown in Figure 1, is insulated and which serves to move the finger 35 away from the contact 23. There is a pushbutton 43 in the conductor 28 for closing communication therethrough.

With this construction the operator may press the button 43, which energizes the coil 31 of the relay and closes the contact 33 with the contact 29 and also closes the contact 39 with the contact 27. When the bell 12 of the gasometer is in its lowermost position and within the body 11, the trip 42 will be spaced from the finger 35 and the contact 44 on the finger 35 will engage the contact 23. Therefore, it will be seen that, when the button 43 is pressed to energize the relay coil 31, and when the contact 33 engages the contact 29 and the contact 39 engages the contact 27, the relay will be locked in this position by the passage of a current from the conductor 19 to the conductor 21, through the coil 31 to the contact 29, thence to the contact 33, through the conductor 34 to the finger 35, the contacts 44 and 23, and through the conductor 21. It will also be understood that the solenoid 15 of the valve 14 will open the said valve, inasmuch as the conductor 19 is connected with the solenoid 15 and the current will then pass through the conductor 40 to the contacts 39 and 27 and the conductor 26 to the conductor 21. Air or other fluid will then pass through the inlet 13 to the gasometer and raise the gasometer bell 12, carrying with it upwardly the scale 41. When the trip 42 at the zero mark on the gasometer bell engages the finger 35 to raise the latter, the contact 44 will be moved away from the contact 23 to break the circuit which has served to lock the relay. This will also break the circuit energizing the solenoid 15 and the valve 14 will close. Subsequently, when the air or other fluid is permitted to escape from the gasometer bell 12, the finger 35 will descend and the contact 44 will again engage the contact 23, permitting the refilling of the gasometer as desired.

It will be understood that the gasometer bell of a particular gasometer may be filled by the operator pressing the pushbutton 43, after which the operator may apply himself to other work, with the assurance that the valve 14 will be closed when a predetermined quantity of air or other fluid has entered the gasometer bell.

The frame 45, shown in Figures 2, 3 and 4 of the drawings, is attached to the meter which is to be tested, this frame 45 having a body and extending studs 46 which are held together by a tie bar 47, a screw 48 being journaled in the frame 45 of the tie bar 47 and having a crank 49 by which it may be conveniently turned. Slidably mounted on the studs 46 there is a clamp 50 which has a threaded aperture 51 with which the screw 48 meshes. It will be understood that by turning the crank 49, the clamp 50 may be moved to or from the frame 45, as desired. By referring to Figure 4 of the drawings, it will be seen that the clamp 50 has a depending portion 51' which is adapted to be disposed in an opening 52 in a meter 53 to engage the inner side of the meter, while the outer side of the meter is engaged by the frame 45.

By the means which has been described, the frame 45 may be rigidly secured to the meter 53. The frame 45 has bearings 54 in which is journaled a shaft 55 having a worm 56 with which meshes a worm wheel 57 secured to a shaft 58 journaled in a portion 59 of the frame, there being a gear 60 secured to the shaft 58 which meshes with the teeth 61 on a rack bar 62, the rack bar 62 sliding in a guideway 63 which is supported by the frame 45. To the shaft 55 there is secured a crank 64 by which the shaft may be rotated, which, by the means described, serves to move the rack bar 62 horizontally and relatively to the frame 45. Mounted on the rack bar 62 there is a carriage 65 which has bearings 66 in which a shaft 67 is journaled, the carriage 65 also having guideways 68 in which a rack bar 69 is slidably disposed.

It will be seen, by referring to Figure 2, that the shaft 67 is disposed horizontally and substantially at right angles to the shaft 58 so that, when the shaft 67 is rotated, the gear 70 thereon, which meshes with the teeth on the rack bar 69, will serve to move the rack bar 69 in its guideways 68, the guideways 68 being disposed horizontally and at right angles to the guideways 63. Secured to the shaft 67 there is a worm wheel 71 with which meshes a worm 72 secured to a shaft 73 journaled in bearings in the carriage 65. Mounted for rotation on this shaft 73 there is a crank 74 to which is pivoted a pawl 75 held in yielding engagement with the ratchet 77 by a spring 76. The spring 76 has sufficient resistance to hold the pawl 75 in engagement with the ratchet 77 under ordinary conditions and provides for a yielding drive when the crank 74 is rotated in one direction to move the rack bar 69 inwardly, while it secures a positive drive when the crank 74 is rotated in the opposite direction to move the rack bar 69 away from the meter 53. Carried by the rack bar 69 there is a carriage 78 which has bearings in which a horizontal shaft 79 is journaled, the shaft 79 having a worm 80 with which meshes a worm wheel 81 mounted on a shaft 82 journaled in bearings in the carriage 78, there being a gear 83 secured to the shaft 82, the gear 83 meshing with teeth 84 on a rack bar 85 movable in guideways 85' mounted on the carriage 78. The shaft 79 has a thumbpiece 86 by which it may be rotated. There is also secured to the shaft 79 a ratchet wheel 87 with which pawls 88 mounted on the carriage 78 are adapted to engage. These pawls 88 have springs 89 which are engaged by an arm 90 of a lever 91 pivoted to the carriage 78, the lever 91 having an armature 92 disposed at a locking magnet 93 for movement thereby. A carriage 94 is secured for movement with the rack bar 85.

By the means described, the carriage 94 may be moved relatively to the frame 45 horizontally in two directions and also vertically. Mounted on the carriage 94 there is a double-throw contact or switch member 95 having contacts 96 and 97 for engagement with the contacts 98 and 99, the contact 99 being supported on a resilient arm 100 secured to the carriage. Pivoted to the carriage 94 there is a bell-crank lever 101 which has a foot 102 engageable with the contact member 95 at an insulation pad 103 thereon.

As has been stated, the outlet 16 leads to the valve 17 and then through the outlet 16' to the meter 53 having an index hand 104. The solenoid 18, the locking magnet 93, the contact member 95 and the contacts 98 and 99 are connected with relays 105 and 106, as illustrated in Figure 1 of the drawings.

A conductor 107 connects the lead 22 with the contact member 95, a conductor 108 leads from the contact 98 to a contact 109, and a conductor 110 leads from the contact 99 to the contact 111. The relays 105 and 106 are normally energized as illustrated in Figure 1 of the drawings. It will be seen that a conductor 112 is connected with the lead 22 and a contact 113 which normally engages the contact 114, from which leads a conductor 115 to the coil 116, a conductor 117 leading from the coil 116 from which branches a conductor 118 having a resistance 119, the conductor 118 being connected with the lead 20. The relay 105 is thus normally energized. A conductor 121 is connected with the lead 22 and with the contact 122, which normally engages the contact 123, a conductor 124 leading from the contact 123 to the coil 125, from which leads a conductor 126 having a resistance 127, the said conductor 126 being connected with the lead 20. The relay 106 is thus normally energized.

When the lever 101 is up out of engagement with the index hand 104, the foot 102 will be clear of the switch 95 and permit the contact 96 to assume its normal position against the contact 98. The carriage 94 is now moved downwardly by rotating the thumb-piece 86 until the lever 101 engages the index hand 104. The index hand constitutes an abutment, and when the lever 101 reaches it the lever is turned until it assumes the position shown in Figure 1. This will disengage the contact 98 and bring the contacts 97 and 99 into engagement to deenergize the coil 125 and remove the contact 122 from the contact 123 and bring the contact 122 into engagement with the contact 120, and will disengage the contact 109 from the contact 129 and bring the contact 109 into engagement with the contact 130, a current passing from the contact 99 through the conductor 110 to the contact 111, the contact 131, through the conductor 132 to the conductor 126 and through the resistance 127 to the lead 20, which will short-circuit the coil 125 and will deenergize the relay 106, and, with the contact 122 at the contact 120, current will flow from the lead 22 through the conductor 121, the contact 122, the contact 120 to the conductor 133, to the solenoid 18 at the valve 17, and then through the conductor 134 to the lead 20. A conductor 135 leads from the conductor 133 to the locking magnet 93, and a conductor 137 leads from the locking magnet 93 to the conductor 134. It will, therefore, be understood that, when the carriage 94 is moved downwardly so that the index hand 104 will serve to rotate the lever 101 to move the contact member 95 to bring its contact 97 into engagement with the contact 99, immediately the valve 17 will be opened, permitting a flow of the air or other fluid to the meter 13 and, further, that the locking magnet 93 will lock the carriage 94 by means of the pawls 88 to prevent a further movement of the carriage 94 carrying the lever 101.

With the passage of the air or gas from the gasometer bell 12 to the meter 53, the index hand 104 will be rotated and, with the rotation of the index hand 104, the lever will move to permit the passage of the index hand, this being possible in view of the resiliency of the contact member 95 and the resilient arm 100 on which the contact 99 is mounted. When the lever 101 slips off the index hand 104, the contact 97 will move from the contact 99 and the contact 96, under the action of the resilient contact member 95, will again contact with the contact 98, which will cause the relay 105 to become deenergized and which will open the contacts 113 and 114 and the contacts 111 and 131 and the contact 111 will engage the contact 138. With the relay 106 deenergized, a current will now pass from the contact 96 to the contact 98, through the conductor 108 to the contact 109, to the contact 130, the conductor 139 to the conductor 118 and through the resistance 119. This will short-circuit the relay 105. Both relays are now open.

When the index hand 104 makes a complete revolution, it will press the lever 101 so that it will engage the insulation pad 103 on the contact member 95 to move the contact member 95 so that the contact 97 will again engage with the contact 99. The current will now pass from the lead 22 to the contact 97, to the contact 99, to the conductor 110, to the contact 111, to the contact 138, to the conductor 140, to the conductor 124 and through the coil 125, which will energize the relay 106 breaking the circuit at the contacts 122 and 120 and thereby deenergizing the solenoid 18 at the valve 17 and also deenergizing the locking magnet 93. It will be understood that, when the lever 101 is free from the index hand 104, the contact member 95 will again assume the position where the contact 96 will engage the contact 98, and a current will flow from the contact 98 through the conductor 108 to the contacts 109 and 129 to the conductor 140, the conductor 115, through the coil 116, the conductor 118, the resistance 119 to the conductor 20. Both relays 105 and 106 will now be energized.

It will be understood that, with the complete rotation of the index hand 104, a quantity of air or other fluid has passed through the meter and has been indicated by the index hand, in accordance with the adjustment of the meter. The actual amount of air or other fluid which has passed through the meter may be accurately determined by inspecting the scale 41 on the gasometer bell 12. It may be quickly determined whether or not the meter is properly adjusted for accurate reading by examining the position of the fixed pointer with reference to the scale 41 on the gasometer bell 12 after the index hand has made a complete rotation and the valve 17 at the outlet from the gasometer has been opened at the commencement of the flow of the air or other fluid from the gasometer to the meter and has been closed after one complete rotation of the index hand 104.

The movement of the carriages 65 and 78 will adjust the carriage 94 horizontally, longitudinally and transversely of the frame 45 and the yielding drive at the pawl 75 and the ratchet 77 will prevent injury to the face of the meter at the index hand 104 by the lever 101.

What is claimed is:

1. In a meter testing device, a lever for engagement by an index hand of a meter, two contacts, a contact member movably mounted for engaging the said contacts one at a time, the said contact member being disposed for movement by the lever, means mounting the lever for movement against the index hand to bring the contact member into engagement with one of the contacts, means to lock the first mentioned means, a valve, and means cooperating with the contacts and the valve and the second mentioned means for operating the valve and the second mentioned means.

2. In a meter testing device, a lever operable by an index hand of a meter, two contacts spaced apart, a contact member adapted for movement by the lever and movably mounted adjacent to the lever and between the said two contacts and normally engaging one of the contacts, means mounting the lever for movement against the index hand for engaging and moving the contact member from said contact and into engagement with the other contact, means for locking the first mentioned means, a valve, and means cooperating with the contacts and the valve and the second mentioned means for operating the valve and the second mentioned means.

3. In a meter testing device, a lever operable by an index hand of a meter, two contacts spaced apart, a contact member movably mounted adjacent to the lever for movement thereby, the contact member being disposed between the said two contact members and normally engaging one of the contacts, means mounting the lever for movement against the index hand to move the contact member away from the said contact and into engagement with the other contact, a valve, and electrical means cooperating with the contacts and the valve for operating the latter.

4. In a meter testing device, a frame, a carriage mounted on the frame, a lever movably mounted on the carriage, two contacts mounted on the carriage, a contact member movably mounted on the carriage between the said two contacts and normally engaging one of the contacts, the contact member being positioned for movement by the lever for engaging the other contact, means for moving the carriage relatively to the frame, a gasometer having an outlet, a valve at the outlet, and electrical means connecting the contacts with the valve for operating the latter.

5. In a meter testing device, a frame, a carriage mounted on the frame, a lever movably mounted on the carriage, two contacts mounted on the carriage, a contact member movably mounted on the carriage between the said two contacts and normally engaging one of the contacts, the contact member being positioned for movement by the lever for engaging the other contact, means for moving the carriage relatively to the frame, means for locking the first mentioned means, a gasometer having an outlet, a valve at the outlet, and electrical means connecting the contacts with the valve and the second mentioned means for operating the valve and the second mentioned means.

6. In a meter testing device, a frame, a carriage movable horizontally on the frame, a second carriage mounted for vertical movement on the first mentioned carriage, a lever movably mounted on the second mentioned carriage, two contact members spaced apart on the second mentioned carriage, and a contact member movably mounted on the second mentioned carriage between the said two contacts and being positioned for movement by the lever from one contact to the other contact.

7. A device for testing a meter which has a movable index hand, means including a valve to control the flow of fluid to the meter casing and actuating means for opening and closing the valve, control means by which the actuating means is operated, a movable element constituting an operative connection between the index hand and said control means and being adapted upon movement to render said control means active, and means for shifting said element into operative relationship with the index hand thereby to move said element and render the control means active to set the actuating means in operation for opening the valve.

8. A device for testing a meter which has a movable index hand normally stationary in an abuttable position at the beginning of a meter test, means including a valve to control the flow of fluid to the meter casing and actuating means for opening and closing the valve, control means by which the actuating means is operated, a movable element operatively connected to said control means and adapted upon movement to render said control means active, and means for shifting said element against the index hand, the resistance offered by said hand moving said element to render the control means active for setting the actuating means in operation thereby to open the valve for the admission of fluid to the meter casing and the starting of the index hand on a cycle of movement.

9. A device for testing a meter which has a movable index hand normally stationary in an abuttable position at the beginning of a meter test, means including a valve to control the flow of fluid to the meter casing and actuating means for opening and closing the valve, control means by which the actuating means is operated, a movable element constituting an operative connection between the index hand and said control means said element being adapted upon movement to render the control means active, and means for shifting said element against the index hand, the resistance offered by said hand moving said element to render the control means active for setting the actuating means in operation thereby to open the valve for the admission of fluid to the meter casing and the starting of the index hand on a cycle of movement.

10. A device for testing a meter which has a movable index hand normally stationary in an abuttable position at the beginning of a meter test, means including a valve to control the flow of fluid to the meter casing and actuating means for opening and closing the valve, control means by which the actuating means is operated, a movable element operatively connected to said control means and adapted upon movement to render said control means active, a movable carriage supporting said element, and means for so moving the carriage as to shift said element against the index hand, the resistance offered by said hand moving said element to render the control means active for setting the actuating means in operation thereby to open the valve for the admission of fluid to the meter casing and the starting of the index hand on a cycle of movement.

11. A device for testing a meter which has a movable index hand normally stationary in an abuttable position at the beginning of a meter test, means including a valve to control the flow of fluid to the meter casing and actuating means for opening and closing the valve, control means by which the actuating means is operated, a movable element operatively connected to said control means and adapted upon movement to render said control means active, a movable carriage supporting said element, means for so moving the carriage as to shift said element against the index hand, the resistance offered by said hand moving said element to render the control means active for setting the actuating means in operation thereby to open the valve for the admission of fluid to the meter casing and the starting of the index hand on a cycle of movement, and means for locking the carriage to prevent immediately further movement.

12. A device for testing a meter which has a movable index hand normally stationary in an abuttable position at the beginning of a meter test, means including a valve to control the flow of fluid to the meter casing and electromagnetic actuating means for opening the valve, electrical control means by which said actuating means is operated, said means including a switch, a movable element operatively connected to said control means and adapted upon movement to work the switch, and means for shifting said element into operative relationship with the index hand, the resistance offered by said hand moving said element to throw the switch into position to cause the electrical control means to set the electromagnetic actuating means in operation thereby to open the valve for the admission of fluid to the meter casing and the starting of the index hand on a cycle of movement.

13. A device for testing a meter which has a movable index hand normally stationary in an abuttable position at the beginning of a meter test, means including a valve to control the flow of fluid to the meter casing and electromagnetic actuating means for opening the valve, a shiftable carriage, an electrical lock to secure the carriage when it has been shifted into a required position with respect to the index hand, electrical control means embracing said actuating means and the electrical lock, a switch for said control means, a movable element supported by the carriage said element being operatively connected to said control means and adapted upon movement to work the switch, and means to shift the carriage into said position, the resistance offered by the index hand moving said element to close the switch thereby energizing said actuating means and lock respectively to open the valve and lock the carriage.

14. A device for testing a meter which has an index hand normally in a stationary abuttable position but rotatable through a test circle, means including a valve for controlling the flow of fluid to the meter casing, operating means to open and close the valve, means including a movable element for controlling said operating means, means for advancing said element into engagement with the stationary hand, said engagement being adapted to cause a first movement of the element and thereby causing the operating means to open the valve and start the hand on its circle ultimately to re-engage the element at the end of the circle, and thereupon cause a second movement of the element causing the operating means to close the valve.

15. A device for testing a meter which has a movable index hand in a normally stationary abuttable position, means including a valve for supplying the meter casing with fluid and means for actuating the valve, electrical control means for the actuating means including normally energized relay sets, a double-throw switch for the electrical control means, a movable element adapted to operate said switch, carrying means for advancing the element until it engages the stationary hand and causes a first movement of the element to throw said switch to a first position and thereby de-energize one of the relays and energize the actuating means to open the valve and start the hand on a test cycle, the departure of the hand from the movable element causing a second movement of said element to throw the switch to its second position and de-energize the other relay, the return of the hand to the beginning of its cycle causing a third movement of the element to restore the switch to said first position and de-energize the first relay to cause de-energization of the actuating means and closure of the valve.

PHILIP B. R. BAAS.